United States Patent
Ushiku

(10) Patent No.: US 7,829,607 B2
(45) Date of Patent: Nov. 9, 2010

(54) WATER-BASED HEAT FIXING INK AND HEAT FIXING INKJET RECORDING METHOD

(75) Inventor: Masayuki Ushiku, Kanagawa (JP)

(73) Assignee: Konica Minolta Holdings, Inc., Tokyo (JP)

( * ) Notice: Subject to any disclaimer, the term of this patent is extended or adjusted under 35 U.S.C. 154(b) by 228 days.

(21) Appl. No.: 12/057,568

(22) Filed: Mar. 28, 2008

(65) Prior Publication Data

US 2008/0252709 A1    Oct. 16, 2008

(30) Foreign Application Priority Data

Apr. 11, 2007   (JP) .............................. 2007-103578

(51) Int. Cl.
*C03C 17/00* (2006.01)

(52) U.S. Cl. ...................... 523/160; 347/100; 347/102; 106/31.13; 106/31.6

(58) Field of Classification Search ................. 347/102, 347/100; 106/31.13, 31.6; 523/160
See application file for complete search history.

(56) References Cited

U.S. PATENT DOCUMENTS

| 4,900,774 | A | * | 2/1990 | Mitsuji et al. ............... 524/512 |
| 5,658,376 | A | * | 8/1997 | Noguchi et al. ............ 106/31.43 |
| 6,821,329 | B2 | * | 11/2004 | Choy ....................... 106/31.58 |
| 2003/0097960 | A1 | * | 5/2003 | Ito et al. .................... 106/31.58 |
| 2003/0125414 | A1 | * | 7/2003 | Nakajima et al. ............ 523/160 |
| 2004/0058815 | A1 | * | 3/2004 | Sakurai et al. ............... 503/201 |
| 2005/0151815 | A1 | * | 7/2005 | Kanai et al. ................. 347/102 |
| 2006/0170724 | A1 | * | 8/2006 | Uji et al. ....................... 347/16 |

FOREIGN PATENT DOCUMENTS

| EP | 1193301 | 4/2002 |
| EP | 1715010 | 10/2006 |
| JP | 0712912 | 5/1996 |
| JP | 2002526631 | 8/2002 |
| JP | 2005015672 | 1/2005 |
| JP | 2005036199 | 2/2005 |
| JP | 2005060716 | 3/2005 |
| JP | 2005113147 | 4/2005 |
| JP | 1754759 | 2/2007 |
| WO | 2004007626 | 1/2004 |

\* cited by examiner

*Primary Examiner*—Matthew Luu
*Assistant Examiner*—Rut Patel
(74) *Attorney, Agent, or Firm*—Lucas & Mercanti, LLP

(57) ABSTRACT

A water-based heat fixing ink having at least the following 4 compounds, a: pigment; b: water-soluble resin comprising a copolymer, in which a monomer having a carboxyl group and monomer having a hydrophobic group are polymerized, and the resin is dissolved by neutralization with an amine; c: an organic solvent satisfying following Equation (1) which is represented by a hydrogen bonding term and a polar term of a solubility parameter; and d: water; wherein b is contained in an amount of 2.5-7.0 weight % as a free polymer in a water-based heat fixing ink, $$8 \leq (\sigma_p^2 + \sigma_h^2)^{1/2} \leq 12 \qquad \text{Equation (1)}.$$

7 Claims, No Drawings

WATER-BASED HEAT FIXING INK AND HEAT FIXING INKJET RECORDING METHOD

This application is based on Japanese Patent Application No. 2007-103578 filed on Apr. 11, 2007, in Japanese Patent Office, the entire content of which is hereby incorporated by reference.

FIELD OF THE INVENTION

The present invention relates to a new water-based heat fixing ink applied for inkjet and a heat fixing inkjet recording method utilizing the same, and more specifically related to a water-based heat fixing ink applicable for inkjets recording, which rarely generates spottiness, provides an excellent image having a high glossy feeling during high speed printing, and exhibits excellent storage stability, as well as a heat fixing inkjet recording method utilizing the same.

BACKGROUND OF THE INVENTION

In recent years, an inkjet recording method has been applied in various printing fields such as photography, various printing, special printing such as marking and production of color filters owing to its adaptability of image formation in a simple and low-cost manner.

An inkjet ink utilized in such an inkjet method includes a water-based ink comprised of water and a small amount of organic solvent, a non-water-based ink comprised of an organic solvent with almost no water, a hot-melt ink which is solid at room temperature and printed by being thermally melted, and an actinic ray curable ink which is cured by actinic rays such as light after printing. Any of these inks are selected based on specific requirement.

On the other hand, a sheet made of polyvinyl chloride as a water non-absorptive recording medium is utilized for a wide range of applications such as for outdoor signs which require long term weather resistance, and printing media which require adhesion to an object of curved surfaces. There are a plural number of methods to print on polyvinyl chloride; however, there is an inkjet recording method as a method which requires no plate making, a short preparation time, and is suitable for production in low members but for many types of products.

As an example of an inkjet ink capable of recording on the aforesaid polyvinyl chloride recording media, an inkjet ink containing cyclohexanone has been disclosed (please refer to Patent Document 1). Cyclohexanone exhibits a high solubility in polyvinyl chloride, and pigment in an inkjet ink dissolves into polyvinyl chloride, therefore excellent abrasion resistance can be obtained. Further, a non-water-based ink containing a solvent such as N-methylpyrrolidone is disclosed as a solvent exhibiting low odor, making it preferable with respect to a safer working environment compared to cyclohexanone (please refer to Patent Documents 2 and 3). Further, to improve a non-water-based ink incorporating a resin such as vinyl chloride-vinyl acetate copolymer and acryl has been disclosed (please refer to Patent Documents 4 and 5).

By use of these inkjet inks, an inkjet ink, which can considerably low odor and exhibits excellent abrasion resistance to polyvinyl chloride, can be prepared; however, there is a concern of environmental load due to the large amount of solvent vaporized during drying.

To counter this problem, disclosed has been vinyl film or a medium coated with vinyl to serve as a recording medium, on which a water-based pigment ink which is thermally fixed by use of a water-soluble resin (please refer to Patent Document 6). However, an ink containing resin represented by this document exhibits only short term storage stability. Further, a relatively good image can be prepared with a scanning type printer in which an image is formed by scanning an inkjet head several times, however, it exhibits only low image precision due to such as spottiness in a high speed system such as a 1-pass type printer in which an image is formed in one time scanning. Further, in the case of utilizing a water non-absorptive recording medium, compatibility of a higher print speed and image quality is difficult to achieve, which requires further improvement.

[Patent Document 1] Japanese Translation of PCT International Application Publication No. 2002-526631
[Patent Document 2] JP-A 2005-15672 (hereinafter, JP-A refers to Unexamined Japanese Patent Application Publication No.)
[Patent Document 3] JP-A 2005-60716
[Patent Document 4] JP-A 2005-36199
[Patent Document 5] International Patent Application Publication No. 04/007626 pamphlet
[Patent Document 6] JP-A 2005-113147

SUMMARY OF THE INVENTION

This invention has been achieved in view of the above described concerns. An object of the present invention is to provide a water-based heat fixing ink, which can provide excellent print quality without spottiness generation on a water non-absorptive recording medium at high production speed, in addition to a water-absorptive medium represented by paper; as well as a water-based heat fixing inkjet ink which rarely causes deterioration of printed image quality and printer head clogging due to damage to printer or a change of ink even over long term usage, and which is stable over long duration; and a heat fixing inkjet recording method utilizing the same.

Means to Solve the Problems

The above-described object of this invention can be achieved by the following constitutions.

Item 1. A water-based heat fixing ink comprising at least the following 4 compounds.

a: Pigment.

b: A water-soluble resin comprising a copolymer, in which a monomer having a carboxyl group and a monomer having a hydrophobic group are polymerized, and the resin is dissolved by neutralization with an amine.

c: An organic solvent satisfying following Equation (1) which is represented by a hydrogen bonding term and a polar term of a solubility parameter.

d: Water.

Herein, b is contained in an amount of 0.5-7.0 weight % as a free polymer in a water-based heat fixing ink.

$$8 \leq +(\sigma_p^2 + \sigma_h^2)^{1/2} \leq 12 \qquad \text{Equation (1)}$$

Item 2. The water-based heat fixing ink described in aforesaid Item 1, wherein the aforesaid organic solvent is represented by following Formula (1).

$$R\text{—}O\text{—}(CH_2CH_2O)_n\text{—}R \qquad \text{Formula (1)}$$

(In the formula, R is $CH_3$ or $C_2H_5$ and n is an integer of 2-4.)

Item 3. The water-based heat fixing ink described in aforesaid Item 1 or 2, wherein a content of the aforesaid organic solvent is 10-35 weight %.

Item 4. The water-based heat fixing ink described in any one of aforesaid Items 1-3, wherein the aforesaid organic solvent is diethylene glycol diethyl ether.

Item 5. The water-based heat fixing ink described in any one of aforesaid Items 1-4, wherein a water-based heat fixing ink further contains an organic solvent selected from diethylene glycol monobutyl ether, triethyleneglycol monobutyl ether and 1,2-alkanediol.

Item 6. A heat fixing inkjet recording method comprising the steps of:

(a) ejecting the water-based heat fixing ink described in any one of aforesaid Items 1-5 onto a recording side of a non-water-absorptive recording medium, and a surface temperature of the recording side of the recording medium is heated to 40-90° C., and (b) heating the ejected ink to record an image.

EFFECTS OF THE INVENTION

This invention can provide a water-based heat fixing ink, which can in turn provide excellent print quality at high speed without spottiness generation on a water non-absorptive recording medium in addition to on a water-absorptive medium represented by paper; further it rarely causes deterioration of printed image quality and nozzle clogging due to damage of printer or due to a change of ink even over long term usage, and is stable over a long period; and a heat fixing inkjet recording method utilizing the same.

DETAILED DESCRIPTION OF THE INVENTION

The inventors of this invention, as a result of extensive study in view of the above described concerns, have found that a water-based heat fixing ink characterized by containing at least the following four types of compounds can provide excellent image quality with significant restraint of spottiness generation at a higher printing speed.

a: Pigment, b: Water-soluble resin comprising a copolymer, in which a monomer having a carboxyl group and a monomer having a hydrophobic group are polymerized, and the resin is dissolved by neutralization with an amine, c: An organic solvent satisfying following Equation (1) which is represented by a hydrogen bonding term and a polar term of a solubility parameter, d: Water Herein, "b" is contained in an amount of 0.5-7.0 weight % as a free polymer in a water-based heat fixing ink.

$$8 \leq (\sigma_p^2 + \sigma_h^2)^{1/2} \leq 12 \qquad \text{Equation (1)}$$

The aforesaid effects of this invention has not been clarified, however, it is estimated to be as follows. To accelerate drying by heating a water-based heat fixing ink containing a water-soluble resin, due to contribution of a rapid viscosity increase, is a high speed printing means effective to restrain aggregation of solution droplets. As a result of extensive study on a means to increase viscosity of a water-based heat fixing ink by drying concentration, it has been found that, in a water-based heat fixing ink containing water-soluble resin comprising a copolymer, in which at least a monomer having a carboxyl group and a monomer having a hydrophobic group are polymerized, and a resin is dissolved by neutralizing with an amine, viscosity increase range significantly differs depending on the type of utilized organic solvent. A higher viscosity increase effect can be attained by utilizing an organic solvent satisfying aforesaid Equation (1) represented by a hydrogen bonding term and a polar term of a solubility parameter. Specifically, a higher viscosity increase effect can be attained by utilizing an organic solvent exhibiting a value of $(\sigma_p^2+\sigma_h^2)^{1/2}$ of at most 12. An organic solvent in this range is relatively hydrophobic, and it is considered that a viscosity increase is achieved by a hydrophobic interaction with the water-soluble resin. Water-soluble resin according to this invention is considered to enhance viscosity due to evaporation of neutralizing amine during ink drying, as well as due to a hydrophobic segment. It is assumed that aggregation of solution droplets is restrained which depresses spottiness generation during high speed printing due to promotion of viscosity increasing capability. An organic solvent is highly miscible in water and is highly applicable for a water-based ink provided that the lower limit of the value of $(\sigma_p^2+\sigma_h^2)^{1/2}$ is at least 8.

In the following, a water-based heat fixing ink based on this invention (hereinafter, also referred to simply as an ink) will be more specifically explained.

(a: Pigment)

Pigments utilized in this invention will now be explained.

As pigments utilized in this invention, those well known in the art may be utilized without specific limitation, and either a water dispersible pigment or a solvent dispersible pigment may be utilized. Organic pigments such as an insoluble pigment and a lake pigment in addition to an inorganic pigment such as carbon black are preferably utilized. These pigments exist in a state of being dispersion in the ink, which dispersion method may be any one of the following: self dispersion, dispersion utilizing a surfactant, polymer dispersion and micro-capsule dispersion, of which, micro-capsule dispersion is specifically preferable with respect to its capability to provide long-term storage stability to the ink.

Insoluble pigments are not specifically limited and preferable of such are: azo, azomethine, methine, diphenylmethane, quinacridone, anthraquinone, perylene, indigo, quinophthalone, isoindolinone, isoindoline, azine, oxazine, thiazine, dioxazine, thiazole, phthalocyanine and diketopyrrolopyrrole.

Specific preferable pigments include the following.

Pigment for magenta or red includes such as C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C. I. Pigment Red 202, C. I. Pigment Red 222 and C. I. Pigment Violet 19.

Pigment for yellow includes such as C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 15:3, C. I. Pigment Yellow 17, C. I. Pigment Yellow 74, C. I. Pigment Yellow 93, C. I. Pigment Yellow 128, C. I. Pigment Yellow 94 and C. I. Pigment Yellow 138.

Pigment for cyan includes such as C. I. Pigment Blue 15, C. I. Pigment Blue 15:2, C. I. Pigment Blue 15:3, C. I. Pigment Blue 16, C. I. Pigment Blue 60 and C. I. Pigment Green 7.

Further, pigment for black includes such as C. I. Pigment Black 1, C. I. Pigment Black 6 and C. I. Pigment Black 7.

The mean particle size in a dispersed state of pigment contained in an ink of this invention is preferably not less than 50 nm and less than 200 nm. In the case of the mean particle size of pigment dispersion of less than 50 nm or not less than 200 nm, stability of pigment dispersion becomes poor resulting in liable deterioration of storage stability of an ink.

Particle size measurement of pigment dispersion can be conducted by use of a particle size analyzer available on the market applying such as a dynamic light scattering method and an electrophoresis method, however, measurement by a dynamic light scattering method is often employed because of convenience and precision for this particle size range.

Pigment utilized in this invention is preferably utilized by being dispersed by a homogenizer together with a dispersant and other additives which are required depending on desired various purposes. As a homogenizer, such as a ball mill, a sand mill, a line mill and a high pressure homogenizer, which are well known in the art, can be utilized. Among them, a sand mill is preferable because particle size distribution of an ink produced by a sand mill is sharp. Further, a material of beads utilized in sand mill dispersion is preferably zirconia or zircon with respect to contamination of beads fragments and ion components.

For an ink of this invention, a polymer dispersant can be employed in the above-described dispersion.

A polymer dispersant referred to in this invention is provided with a polymer component having a molecular weight of 5,000-200,000. A type of a polymer dispersant includes block copolymer, random copolymer and salt thereof comprising at least two types of monomers selected from styrene, styrene derivatives, vinylnaphthalene derivatives, acrylic acid, acrylic acid derivatives, maleic acid, maleic acid derivatives, itaconic acid, itaconic acid derivatives, fumaric acid and fumaric acid derivatives; polyoxyalkylene, and polyoxyalkylene alkyl ether.

In the case of an acidic polymer, it is preferably added by being neutralized with neutralizing base. Herein, a neutralizing base is not specifically limited; however, is preferably an organic base such as ammonia, monoethanol amine, diethanolamine, triethanolamine and morpholine.

Further, in this invention, the addition amount of a polymer dispersant is preferably 10-100 weight % against pigment.

Pigment dispersion utilized in this invention is specifically preferably so-called capsule pigment comprising pigment coated with resin. As a method to coat pigment with resin, various methods well known in the art can be employed, however, it is preferably selected from a method, in which pigment is dispersed by use of a polymerizing surfactant and monomer is supplied therein to coat the pigment with polymerization, in addition to, a phase development emulsification method and an acid precipitation method.

The more preferable method is a manufacturing method in which the water-insoluble resin is dissolved in an organic solvent such as methyl ethyl ketone (MEK), and further an acid group in the resin is partially or completely neutralized by a base, being added with the pigment and ion-exchanged water, then subjected to dispersion, the organic solvent being removed, and the resulting solution of which is added an appropriate amount of water.

The ratio of a pigment to a resin can be selected in the range of 100/40-100/150 based on a pigment/resin ratio. Specifically, image durability, ejection stability and storage stability of an ink are excellent in the ratio range of 100/60-100/110.

(b: Water-Soluble Resin)

A water-soluble resin, utilized in this invention, which is a copolymer comprising a monomer having a carboxyl group and a monomer having a hydrophobic group being polymerized and dissolved by neutralization with an amine (hereinafter, referred to as a water-soluble resin), will be explained. Water-soluble resin is preferably resin completely dissolved in an ink, but which becomes hydrophobic during a drying process, because of the aforesaid reason. The term a "water-soluble resin" means that the resin exists in the state of molecularity-dissolved in water, and differs from solubilization as a dispersion state represented by a water-based emulsion. The water-soluble resin preferably exhibits solubility of not less than 1 weight % in water.

As such resin, those featuring a hydrophobic component and a hydrophilic component in a resin can be designed. Herein, a hydrophilic component is an unsaturated vinyl monomer having the aforesaid carboxyl group and includes such as acrylic acid, methacrylic acid and acrylamide. A hydrophobic group preferably utilized includes such as acrylic acid ester (such as n-butyl acrylate, 2-ethylhexyl acrylate and 2-hydroxyethyl acrylate), methacrylic acid ester (such as ethyl methacrylate, butyl methacrylate and glycidyl methacrylate) and styrene.

The molecular weight of the water-soluble resin is preferably in the range of 3,000-30,000, but more preferably in the range of 7,000-20,000.

The Tg of the water-soluble resin is preferably approximately −30 to 100° C., but more preferably in the range of −10 to 80° C.

The acid value of the water-soluble resin is preferably approximately 90-250, and solution polymerization is preferably employed as the polymerization method.

A group having a carboxyl group in the water-soluble resin is required to be partly or completely neutralized with an amine. As an amine, such as ammonia, triethylamine, 2-dimethylaminoethanol, 2-di-n-butylaminoethanol, methyldiethanolamine, 2-amino-2-methyl-1-propanol, diethanolamine, triethanolamine, and 2-methylaminoethanol are preferable.

Specifically, neutralization with an amine exhibiting a boiling point of less than 200° C. is preferable with respect to facilitate evaporation of amine at the time of drying to more rapidly increase the targeted hydrophobic characteristics.

Water-soluble resin is necessarily utilized in the range of 0.5-7.0 weight % as a free polymer to achieve the targeted effects of this invention. That is, spottiness generation will be restrained at not less than 0.5 weight %, and excellent ejection stability will be attained even after storage of an ink at not more than 7.0 weighty %, but a more preferable range is 1-4 weight %.

"Free polymer" referred to in this invention indicates water-soluble polymer which is not adsorbed on pigment particles in an ink, and the amount of free polymer can be measured by means of GPC utilizing a supernatant separated from the ink at 30,000 rpm over 2 hours.

(c: Organic Solvent)

Next, an organic solvent which satisfies aforesaid Equation (1) represented by a hydrogen bonding term and a polar term of a solubility parameter and utilized in this invention will be explained.

A solubility parameter is generally utilized as an index of solubility and is a value derived from the aggregation energy of a molecule. Further, in the Hansen parameter which divides a solubility parameter into each contribution term of a dispersion component, a polar component and a hydrogen bonding component; the hydrogen bonding component is represented by a hydrogen bonding term ($\sigma_h$), a polar component is represented by the polar term ($\sigma_p$), and the unit is $(MPa)^{1/2}$. For example, these are described in Polymer Handbook (Second Edition) IV, Solubility Parameter Values, and the hydrogen bonding term ($\sigma_h$), and the polar term ($\sigma_p$) of a solvent utilized in this invention are values calculated employing an energy contribution term against an atomic group described in Table 4 of Document 9 Chapter VII p. 686. In the case of utilizing plural organic solvents, a weighted average was applied.

At least one organic solvent utilized in this invention is required to have a value represented by $(\sigma_p^2+\sigma_h^2)^{1/2}$, which is expressed by these contribution terms, of not more than 12 and preferably of not more than 9. When it is in this range, spottiness during high speed printing is effectively restrained. The lower limit of $(\sigma_p^2+\sigma_h^2)^{1/2}$ is not specifically limited with respect to spottiness restraint; however, water compatibility can be easily realized when it is not less than 8.

An organic solvent satisfying aforesaid Equation (1) includes acetates such as ethylene glycol monomethyl ether acetate, ethylene glycol monoethyl ether acetate, ethylene glycol diacetate, diethylene glycol monoethyl ether acetate, propylene glycol monomethyl ether acetate, and propylene glycol diacetate; glycol monoalkyl ethers such as tetraethylene glycol monobutyl ether, and dipropylene glycol monobutyl ether; glycol dialkyl ethers such as diethylene glycol dimethyl ether, diethylene glycol diethyl ether, triethylene glycol dimethyl ether, tetraethylene glycol dimethyl ether, and dipropylene glycol dimethyl ether.

Specifically preferable organic solvents are glycol dialkyl ethers, and an organic solvent represented by aforesaid Formula (1) is specifically preferred with respect to restraining effect on spottiness as well as storage stability of an ink. The most preferable organic solvent of all is diethylene glycol diethyl ether.

The addition amount of an organic solvent satisfying aforesaid Equation (1) is preferably in the range of 10-35 weight %, but more preferably in the range of 15-30 weight %. Excellent spottiness resistance can be attained within this range. Herein, an organic solvent satisfying Equation (1) may be utilized alone or combined types thereof may be utilized.

(Other Organic Solvent)

Next, diethylene glycol monobutyl ether, triethylene glycol monobutyl ether, and 1,2-alkanediol according to this invention will be explained. It has been found as a result of study by the inventors of this invention that, in this invention, in addition to an organic solvent in the range of aforesaid Equation (1), addition of an organic solvent selected from diethylene glycol monobutyl ether, triethylene glycol monobutyl ether, and 1,2-alkanediol exhibits the effect of increasing image clarity of printed images. 1,2-alkanediol includes such as 1,2-butanediol, 1,2-pentanediol, 1,2-hexanediol, and 1,2-heptanediol, of which 1,2-hexanediol is specifically preferred.

With respect to enhancement of image clarity, it is estimated that ink droplets will rapidly level out after depositing because diethylene glycol monobutyl ether, triethylene glycol monobutyl ether, and 1,2-alkanediol have high capability to increase dynamic surface tension to form a smooth ink layer, resulting in improvement of image clarity.

An organic solvent selected from diethylene glycol monobutyl ether, triethylene glycol monobutyl ether, and 1,2-alkanediol may be utilized alone or in combination, while the addition amount is preferably 1-10 weight %, and more preferably 2-5 weight %. In this range, restraint of spottiness and excellent image clarity are easily compatible.

(Solvent)

The ink of this invention may incorporate a solvent other than the aforesaid organic solvents.

Specifically, a water-soluble solvent is preferable, and listed are such as alcohols (such as methanol, ethanol, propanol, isopropanol, butanol, isobutanol, secondary butanol, and tertiary butanol), polyhydric alcohols (such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol and thioglycol), amines (such as ethanolamine, diethanolamine, triethanolamine, N-methyldiethanolamine, N-ethyldiethanolamine, N-ethylmorpholine, ethylenediamine, diethylenediamine, triethylenetetramine, tetraethylenepentamine, polyethyleneimine, pentamethyldiethylenetriamine and tetramethylpropylenediamine), amides (such as formamide, N,N-dimethylformamide and N,N-dimethylacetoamide), hetrocyclic compounds (such as 2-pyrrolidone, N-methyl-2-pyrrolidone, cyclohexyl pyrrolidone, 2-oxazolidone and 1,3-dimethyl-2-imidazolidione) and sulfoxides (such as dimethyl sulfoxide).

(d: Water)

Herein, water utilized in this invention is incorporated preferably at not less than 50 weight % and more preferably at not less than 60 weight % based on the total weight of the ink in consideration of increasing drying capability and storage stability of the ink.

(Surfactant)

Surface tension of the water-based heat fixing ink of this invention is preferably adjusted to not more than 30 mN/m and more preferably to not more than 28 mN/m with respect to increasing wettability against a recording medium. To adjust the surface tension to this range, various surfactants are preferably utilized.

Specifically preferable surfactants are a silicone type surfactant, an acetylene glycol type surfactant and a fluorine type surfactant containing a perfluoroalkenyl group. By utilizing these surfactants, sufficient wettability against a medium having a low surface energy such as a recording medium made of polyvinyl chloride can be provided.

A silicone type surfactant is those in which a side chain or a terminal of dimethylpolysiloxane is polyether modified, and such as KF-351A and KF-642 produced by Shin-Etsu Chemical Co., Ltd.; and BYK347 and BYK348 produced by BYK-Chemie GmbH. are available on the market.

An acetylene glycol type surfactant is preferably those provided with a triple bond in a molecule, a hydroxyl group and an alkyl group on the adjacent carbon atom thereof, and a symmetrical structure against the triple bond. An acetylene glycol compound and acetylene alcohol compound utilized in this invention are available on the market and include Surfinol and Olfin produced by Nissin Chemical Co., Ltd. and Acetylenol produced by Kawaken Fine Chemicals Co., Ltd.

A fluorine type surfactant having a perfluoroalkyl group can be synthesized by introducing a hydrophilic group into dimmer, trimer or pentmer which is prepared by polymerization of 4-fluoroethylene or hexafluoropropylene, and any of a nonionic type having a polyoxyethylene ether as a hydrophilic group, an anionic type having sulfonic acid or carboxylic acid or a betaine type having quaternary ammonium salt and carboxylic acid, which are available on the market as Ftergent Series produced by Neos Co., Ltd. can be preferably utilized.

In the ink of this invention, a surfactant other than a silicone type surfactant and a fluorine type surfactant having a perfluoroalkenyl group can be also utilized. Specifically, listed are nonionic surfactants such as polyoxyethylene alkyl ether, polyoxyethylene polyoxypropylene condensates and sorbitan derivatives; anionic surfactants such as alkyl sulfosuccinate and phosphoric acid ester; and amphoteric surfactants such as alkylpolyaminoethyl glycine salt and amidobetaines.

In the ink of this invention, in addition to those above-explained, corresponding to the purpose of improvement of such as ejection stability, adaptability to a printing head and ink cartridges, storage stability, image durability and other various capabilities, various types of additives well known in the art such as polysaccharide, a viscosity controlling agent, a specific resistance controlling agent, a film forming agent, an ultraviolet absorbent, an antioxidant, an anti-fading agent, an anti-fungal agent and a rust inhibitor can be utilized by appropriate selection; and listed are oil droplet micro-particles of such as fluid paraffin, dioctylphthalate, tricresylphosphate and silicone oil; ultraviolet absorbents described in JP-A Nos. 57-74193, 57-87988 and 62-261476; anti-fading agents described in such as JP-A Nos. 57-74192, 57-87989, 60-72785, 61-146591, 1-95091 and 3-13376; fluorescent whitening agents described in such as JP-A Nos. 59-42993, 59-52689, 62-280069 and 61-242871.

Viscosity of the ink comprising the above-described constitution is preferably 1-40 mPa·s, more preferably 5-40 mPa·s and still more preferably 5-20 mPa·s.

(Water Non-Absorptive Recording Medium)

Next, a water non-absorptive recording medium utilized in the heat fixing inkjet recording method of this invention will be explained.

The ink of this invention is suitable for printing not only on a water absorptive recording medium such as ordinary paper, coated paper and inkjet exclusive paper but also on a water non-absorptive medium such as a polyvinyl chloride sheet.

A water non-absorptive recording medium includes a polymer sheet, a board (such as soft vinyl chloride, hard vinyl chloride, an acrylic plate and a polyolefin type), glass, tile, rubber and synthetic paper.

Specific examples of a recording medium comprising polyvinyl chloride include SOL-371G, SOL373M and SOL-4701 (produced by Vigteqnos Co., Ltd.); glossy vinyl chloride (produced by Systemgraphi Co., Ltd.); KSM-VS, KSM-VST and KSM-VT (produced by Kimoto Co., Ltd.); J-CAL-HGX, J-CAL-YHG and J-CAL-WWWG (produced by Kyosyo Co., Ltd. Osaka); BUS MARK V400F vinyl and LITEcal V-600F vinyl (Produced by Flexcon Container, Inc.); FR2 (produced by Hanwha Corp.); LLBAU13713 and LLSP20133 (produced by Sakurai Co., Ltd.); P-370B and P-400M (produced by Kanbo Pras Corp.); S02P, S12P, S13P, S14P, S22P, S24P, S34P and S27P (produced by Grafityp UK Ltd.); P-223RW, P-224RW, P-249ZW and P-284ZC (produced by Lintec Corp.); LKG-19, LPA-70, LPE-248, LPM-45, LTG-11 and LTG-21 (produced by Shinseisha Co., Ltd.); MPI3023 (produced by Toyo & Engineering Corp.); Napoleongloss glossy vinyl chloride (produced by Niki Electronics Co, Ltd.); JV-610 and Y-114 (produced by IKC Co., Ltd.); NIJ-CAPVC and NIJ-SPVCGT (produced by Nitie Corp.); 3101/H12/P4, 3104/H12/P4, 3104/H12/P4S, 9800/H12/P4, 3100/H12/R2, 3104/H12/R2, 1445/H14/P3 and 1438/One Way Vision (produced by AMC Pancke AG., Division Intercoat); JTS129PM, JT5728P, JT5822P, JT5829P, JT5829R, JT5829PM, JT5829R and JT5929PM (produced by Mactac AG.); MPI1005, MPI1900, MPI2000, MPI2001, MPI2002, MPI3000, MPI3021, MPI3500 and MPI3501 (produced by Avery Corp.); AM-101G and AM-501G (produced by Gin-Ichi Corp.); FR2 (produced by Hanwha Japan Co., Ltd.), AY-15P, AY-60P, AY-80P, DBSP137GGH and DBSP137GGL (produced by Insight Inc.); SJT-V200F and SJT-V400F-1 (produced by Hiraoka & Co., Ltd.); SPS-98, SPSM-98, SPSH-98, SVGL-137, SVGS-137, MD3-200, MD3-301M, MD5-100, MD5-101M and MD5-105 (produced by Metamark Corp.); 640M, 641G, 641M, 3105M, 3105SG, 3162G, 3164G, 3164M, 3164XG, 3164XM, 3165G, 3165SG, 3165M, 3169M, 3451SG, 3551G, 3551M, 3631, 3641M, 3651G, 3651M, 3651SG, 3951G, 3641M (produced by Orafol AG.); SVTL-HQ130 (Lami Corporation Inc.), SP300 GWF and SPCLEARAD vinyl (produced by Catalina Co., Ltd.); RM-SJR (produced by Ryoyoshoji Co., Ltd.), Hi Lucky and New Lucky PVC (manufactured by LG Corp.); SIY-110, SIY-310 and SIY-320 (produced by Sekisui Chemical Co., Ltd.); PRINT MI Frontlit and PRINT XL Light weight banner (produced by Endutex Corp.); RIJET 100, RIJET 145 and RIJET 165 (produced by Ritrama Ltd.); NM-SG and NM-SM (produced by Nichiei Kako Co., Ltd.); LTO3GS (Rukio Co., Ltd.); Easyprint 80 and Performance-print 80 (produced by Jetgraph Co., Ltd.); DSE 550, DSB 550, DSE 800G, DSE 802/137, V250WG, V300WG and V350WG (produced by Hexis GmbH.) and Digital White 6005PE and 6010PE (produced Multifix Corp.).

(Heat Fixing Type Ink-Jet Recording Method)

In this invention, printing is conducted with heating a recording medium. By heating a recording medium, a drying viscosity increase rate of an ink is significantly improved to provide a high quality image. Further, durability of an image is also improved. As heating temperature, heating is preferably conducted so as to make a recording surface temperature of a recording medium of 40-90° C. Heating at lower than 40° C. is not preferable because drying requires much time in addition that image quality is insufficient and sufficient image durability cannot be obtained. When the temperature exceeds 90° C., a large effect on ink ejection is caused to make stable printing impossible. It is more preferable to set a recording surface temperature to 40-60° C.

A heating method may be selected from a heating method in which heating is conducted from the lower portion of the recording medium in a non-contact mode or a heating method in which heating is conducted from the lower portion or the upper portion of a recording medium, with such as a heating lamp.

An inkjet head, to be utilized at the time of image formation by ejecting the ink of this invention, may be either an on-demand type or a continuous type. Further, as an ink ejection method, any ejection method such as an electro-mechanical conversion method (for example, a single cavity type, a double cavity type, a vender type, a piston type, a shared-mode type, and a shared-wall type), and an electro-thermal conversion method (for example, a thermal inkjet type and a Bubble Jet (registered mark) type) may be utilized. As an inkjet printer type, utilized may be a type which forms an image via plural scans via a recording head of a shuttle head type, or a 1-pass type via a recording head of a line head type. A 1-pass printing type, in which a recorded image is obtained at a high speed, is specifically preferable. An excellent image can be obtained at high speed and without problems such as spottiness by conducting a recording method in which the ink of this invention is preferably ejected utilizing a piezo-type inkjet line head having a nozzle diameter of not more than 30 µm.

EXAMPLES

In the following, this invention will be specifically explained referring to examples, however, this invention is not limited thereto. In the examples, the expression "part(s)" or "%" refers to "weight part(s)" or "weight %", unless otherwise noted.

Example 1

Preparation of Pigment Dispersion

Styrene-acrylic acid copolymer (Joncryl 678, molecular weight of 850, acid value of 215, produced by Jonson Polymer Corp.) as a pigment dispersant of 3 weight parts, 1.3 parts of dimethylaminoethanol and 80.7 parts of ion exchanged water were mixed with stirring at 70° C. to be dissolved.

Next, the aforesaid solution, after having been premixed with 15 parts of C. I. Pigment 15:3, was homogenized by use of a sand grinder filled at a volume ratio of 50% with zirconia beads of 0.5 mm, whereby a pigment dispersion having a cyan pigment content of 15% was prepared. The mean particle size of pigment particles contained in this pigment dispersion was 122 nm. Herein, particle size measurement was conducted by use of Zetasizer 100HS manufactured by Marvern Instruments Ltd.

(Synthesis of Water-Soluble Resin)

Methyl ethyl ketone of 50 g was charged in a flask equipped with a dropping funnel, a nitrogen introduction tube, a reflux condenser, a thermometer and a stirrer, and heated at 75° C. while being bubbled with nitrogen. Therein, a mixture comprising 40 g of n-butyl methacrylate, 40 g of styrene, 20 g of acrylic acid, 50 g of methyl ethyl ketone and 500 mg of a polymerization initiator (AIBN) was added dropwise over 3 hours. After the dropwise addition, the system was refluxed with heating for further 6 hours. After cooling, methyl ethyl ketone was distilled out by heating under reduced pressure.

In a solution, in which dimethylaminoethanol of an equivalent amount to 1.05 times mole of acrylic acid having been added as a monomer, the above-described polymer residue was dissolved. A water-soluble resin aqueous solution of a solid content of 20% as a result of adjustment with ion exchanged water, having a hydrophobic monomer as a polymer component, was prepared.

<Preparation of Water-Based Heat Fixing Ink>

(Preparation of Ink 1)

The aforesaid pigment dispersion of 26.7 parts was added with 15.0 parts of the aforesaid water-soluble resin aqueous solution with stirring, followed by being added with 28.0 parts of diethylene glycol diethyl ether and 0.3 parts of a silicon type surfactant (KF-351A, produced by Shin-Etsu Chemical Co., Ltd), and the solution was made up to 100.0 parts with ion exchanged water. The ink composition, after preparation, was filtered through a filter of 0.8 μm to prepare ink 1.

(Preparation of Inks 2-13)

Inks 2-13 were prepared in a similar manner to preparation of ink 1 except that an addition amount and a type of the utilized organic solvent were changed as shown in Table 1. Herein, the addition amount of a solvent in each ink was adjusted to make a value of viscosity in a range of ±10W against ink 1. Further, a value of Equation (1), which is represented by a hydrogen bonding term and a polar term of a solubility parameter, with respect to each utilized solvent is also described in Table 1.

<Evaluation of Water-Based Heat Fixing Ink>

The following evaluations were made with respect to each ink prepared above. Herein, surface tension of inks 1-8 measured by a plate method was in a range of 26-28 mN/m.

(Formation of Image)

Each ink was loaded on an inkjet printer mounted with an inkjet head of a drop-on-demand type (having a nozzle number of 512 (256×2 rows), a nozzle opening size of 39 μm, and a nozzle interval of 70.5 μm (141 μm×2 rows)). Successively, a solid image of 35×35 mm was recorded on a recording medium by 1 scan under a condition comprising a head scanning speed of 500 mm/sec, an ink droplet volume of 42 pl, and a recording density of 360×360 dpi (dpi refers to a dot number per 1 inch or 2.54 cm). Herein, in the case of spottiness generation was observed in a recoded image, similar recording was conducted by changing a head scan speed to 400 mm/sec.

Herein, for 3 minutes after image formation and from the start of printing, a recording medium was heated from the backside to control the surface temperature of the recording medium at 45±2° C. The surface temperature of a recording medium was measured by a non-contact thermometer (Model IT-530N, manufactured by Horiba Ltd.).

As a recording medium, JT5929PM (produced by Mactac AG.) made of polyvinyl chloride was utilized.

(Evaluation of Recorded Image)

With respect to the above-described images, an evaluation was made according to the following method.

(Spottiness)

With respect to a recorded image, a state of spottiness generation was visually observed and evaluation was made according to the following criteria.

A: No generation of spottiness is observed under a condition of a head scan speed of 500 mm/sec, which is good quality.

B: Spottiness is partly observed under a condition of a head scan speed of 500 mm/sec, however, no generation of spottiness is observed under a condition of a head scan speed of 400 mm/sec, which is good quality.

C: Spottiness is partly observed under a condition of a head scan speed of 400 mm/sec, however, it is in an allowable range in practical use.

D: Spottiness is observed all over the surface under a condition of a head scan speed of 400 mm/sec, which is out of an allowable range in practical use.

(Image Clarity)

With respect to a recorded image, image clarity was measured by use of Image Clarity Meter ICM-1DP (Suga Test Instruments Co., Ltd.) at reflection of 60° with an optical comb of 2 mm. The evaluation was conducted based on the following criteria.

A: C value % is not less than 61.

B: C value % is in a range of 60-51.

C: C value % is not more than 50.

In the above evaluation, ranks A and B have been judged to be preferable in practical use.

(Storage Stability of Ink)

After each prepared ink having been stored at 70° C. for 2 weeks and for 1 month, flying state was monitored by CCD camera, an emission period of which was synchronized with an ejection period, by use of an ink flying observation system of a strobe emission type described in FIG. 2 of JP-A 2002-363469. Ejection stability was evaluated based on the following criteria.

A: There is no ejection disorder in all nozzles after storage of 2 weeks.

B: There are a few nozzles which exhibit bending in the flying direction after storage of two weeks; however, it is in an allowable range in practical use.

C: There caused nozzle clogging with respect to riot less than one nozzle after storage of two weeks, which is in an unallowable range in practical use.

(Free Polymer Concentration)

Each ink having been prepared was subjected to centrifugal separation for 2 hours with a centrifuge (Cooled High Speed Sentrifuge H-2100M2, produced by Kokusan Co., Ltd.), and the supernatant was collected. The supernatant, after having been drying concentrated, was dissolved in tetrahydrofuran, and the resulting solution was subjected to GPC measurement (HLC-8220GPC, manufactured by Toso Co., Ltd.) to determine a content of free polymer.

The results obtained will be shown in Table 1.

TABLE 1

Unit of $(\sigma_p^2 + \sigma_h^2)^{1/2}$: $(MPa)^{1/2}$ Unit of others: weight %

| Organic solvent | | Ink No. | | | | | | | | | | | | |
|---|---|---|---|---|---|---|---|---|---|---|---|---|---|---|
| Type | $(\sigma_p^2 + \sigma_h^2)^{1/2}$ | 1 | 2 | 3 | 4 | 5 | 6 | 7 | 8 | 9 | 10 | 11 | 12 | 13 |
| Diethylene glycol diethyl ether | 8.1 | 29.0 | 23.0 | | | | | | | | | | 23.0 | 23.0 |
| Diethylene glycol dimethyl ether | 9.3 | | | 23.0 | | | | | | | | | | |
| Triethylene glycol dimethyl ether | 9.3 | | | | 23.0 | | | | | | | | | |
| Tetraethylene glycol dimethyl ether | 9.2 | | | | | 23.0 | | | | | | | | |
| Tetraethylene glycol monobutyl ether | 11.9 | | | | | | 12.4 | | | | | | | |
| Dipropylene glycol dimethyl ether | 8.1 | | | | | | | 23.0 | | | | | | |
| Etylene diacetate | 8.2 | | | | | | | | 23.0 | | | | | |
| Triethylene glycol monobutyl ether | 12.4 | | 5.0 | 4.2 | 1.6 | 1.4 | | 4.6 | 1.5 | 16.9 | | | | |
| Diethylene glycol monobutyl ether | 12.7 | | | | | | | | | | 18.4 | | 4.2 | |
| 1,2-hexanediol | 18.8 | | | | | | | | | | | 16.0 | | 3.6 |
| Evaluation | Spottiness | A | A | B | B | B | C | B | B | D | D | D | A | A |
| | Image clarity | B | A | A | A | A | B | A | A | B | B | B | A | A |
| | *1 | A | A | A | A | A | A | A | B | A | A | A | A | A |
| | *2 | 2.8 | 2.9 | 2.9 | 2.9 | 2.9 | 3.0 | 2.9 | 2.9 | 3.0 | 2.9 | 2.9 | 2.8 | 2.8 |
| Remarks | | Inv. | Inv. | Inv. | Inv. | Inv. | Inv. | Inv. | Inv. | Comp. | Comp. | Comp. | Inv. | Inv. |

*1: Storage stability of ink,
*2: Free polymer concentration,
Inv.: Invention
Comp.: Comparison It is clear from the results described in Table 1, Inks 1-8, 12 and 13 satisfying the requirements of this invention showed excellent results in all evaluation items. On the other hand, other inks which do not satisfy the requirements of this invention showed spottiness generation, which is not allowable in practical use.

Example 2

Inks 14-19 were prepared in a similar manner to preparation of Ink 2 utilized in Example 1, except that the addition amount of a water-soluble resin aqueous solution was changed to a value shown in Table 2 and the amount of triethylene glycol monobutyl ether was changed so as to make the viscosity within ±10% against a viscosity of Ink 1.

With respect to each ink, the results of evaluations conducted in a similar manner to Example 1 will be shown in Table 2.

TABLE 2

| Ink No. | Addition amount of water-soluble resin aqueous solution (weight %) | Spottiness | Image clarity | Storage stability of ink | Free polymer concentration (weight %) | Remarks |
|---|---|---|---|---|---|---|
| 14 | 1.5 | D | B | A | 0.3 | Comp. |
| 15 | 2.6 | C | A | A | 0.5 | Inv. |
| 16 | 6.2 | B | A | A | 1.2 | Inv. |
| 17 | 19.7 | A | A | A | 3.9 | Inv. |
| 18 | 35.1 | A | B | B | 7.0 | Inv. |
| 19 | 41.3 | A | B | C | 8.2 | Comp. |

Comp.: Comparison,
Inv.: Invention

It is clear from the results described in Table 2 that Inks 15-18, free polymer concentration of which is in a range of this invention, shows excellent results in all evaluation items. On the other hand, spottiness generation was out of an allowable range in Ink 14 having a free polymer concentration of 0.3 weight %, and storage stability was insufficient in Ink 19 having a free polymer concentration of 8.2 weight %.

What is claimed is:

1. A water-based heat fixing ink comprising at least the following 4 compounds,
a: a pigment,
b: a water-soluble resin comprising a copolymer, in which a monomer having a carboxyl group and a monomer having a hydrophobic group are polymerized, and the resin is dissolved by neutralization with an amine, c: a first organic solvent satisfying following Equation (1) which is represented by a hydrogen bonding term and a polar term of solubility parameter, and d: water:

wherein b is contained in an amount of 2.5-7.0 weight % as a free polymer in a water-based heat fixing ink, $$8 \leq (\sigma_p^2 + \sigma_h^2)^{1/2} \leq 12 \quad \text{Equation (1).}$$

2. The water-based heat fixing ink of claim 1, wherein the first organic solvent is represented by following Formula (1):

$$R\text{—}O\text{—}(CH_2CH_2O)_n\text{—}R \quad \text{Formula (1)}$$

wherein R is $CH_3$ or $C_2H_5$, and n is an integer of 2-4.

3. The water-based heat fixing ink of claim 1, wherein a content of the first organic solvent is 10-35 weight %.

4. The water-based heat fixing ink of claim 1, wherein the first organic solvent is diethylene glycol diethyl ether.

5. The water-based heat fixing ink of claim wherein a water-based heat fixing ink further comprises a second organic solvent selected from diethylene glycol monobutyl ether, triethyleneglycol monobutyl ether and 1,2-alkanediol.

6. The water-based heat fixing ink of claim 1, wherein b is contained in an amount of 3.9-7.0 weight % as a free polymer in the water-based heat fixing ink.

7. A heat fixing inkjet recording method comprising the steps of:
   (a) ejecting the water-based heat fixing ink described in claim 1 onto a recording side of a non-water-absorptive recording medium, and a surface temperature of the recording side of the recording medium is heated to 40-90° C., and
   (b) heating the ejected ink to record an image.

* * * * *